(12) United States Patent
Chen

(10) Patent No.: US 11,106,071 B2
(45) Date of Patent: Aug. 31, 2021

(54) DISPLAY DEVICE HAVING A BUILT-IN LENS MODULE

(71) Applicant: Wuhan China Star Optoelectronics Semiconductor Display Technology Co., Ltd., Wuhan (CN)

(72) Inventor: Hui Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/492,164

(22) PCT Filed: May 5, 2019

(86) PCT No.: PCT/CN2019/085489
§ 371 (c)(1),
(2) Date: Sep. 9, 2019

(87) PCT Pub. No.: WO2020/181637
PCT Pub. Date: Sep. 17, 2020

(65) Prior Publication Data
US 2020/0292875 A1    Sep. 17, 2020

(30) Foreign Application Priority Data
Mar. 13, 2019    (CN) .......................... 201910189866.4

(51) Int. Cl.
*G02F 1/1333*    (2006.01)
*G02F 1/1335*    (2006.01)
(Continued)

(52) U.S. Cl.
CPC ........ *G02F 1/13338* (2013.01); *G02F 1/1347* (2013.01); *G02F 1/133526* (2013.01);
(Continued)

(58) Field of Classification Search
CPC ........... G02F 1/13338; G02F 1/133526; G02F 1/133528; G02F 1/134309; G02F 1/1347
See application file for complete search history.

(56) References Cited

U.S. PATENT DOCUMENTS 8,687,135 B2 * 4/2014 Son ....................... G06F 3/0412
349/40
2011/0109622 A1   5/2011 Son et al.
(Continued)

FOREIGN PATENT DOCUMENTS

CN    102062965    5/2011
CN    102141714    8/2011
(Continued)

*Primary Examiner* — Dung T Nguyen

(57) ABSTRACT

A display device includes a first substrate, a light-emitting device layer, a main lens module, and a control module. The light-emitting device layer is formed on the first substrate and includes first electrodes. The main lens module is disposed above the light-emitting device layer. The main lens module includes a second substrate, second electrodes formed on a surface of the second substrate, and a first liquid crystal layer disposed above the second substrate. The control module is electrically connected to the first and second electrodes and is configured to control voltages of the first and second electrodes. Electric fields generated between the first electrodes and between the second electrodes drive liquid crystal molecules in the first liquid crystal layer to be deflected and arranged as a first lens structure. The control module controls the voltages of the first and second electrodes to vary a focus of the first lens structure.

13 Claims, 7 Drawing Sheets

(51) Int. Cl.
  *G02F 1/1343* (2006.01)
  *G02F 1/1347* (2006.01)
  *G02F 1/29* (2006.01)

(52) U.S. Cl.
  CPC .. *G02F 1/133528* (2013.01); *G02F 1/134309* (2013.01); *G02F 1/133541* (2021.01); *G02F 1/29* (2013.01); *G02F 2202/28* (2013.01)

(56) References Cited

U.S. PATENT DOCUMENTS

2017/0060296 A1  3/2017  Wang et al.
2018/0188612 A1  7/2018  Gao et al.

FOREIGN PATENT DOCUMENTS

| CN | 104020624 | 9/2014 |
| CN | 105866998 | 8/2016 |
| CN | 105988154 | 10/2016 |
| CN | 106484166 | 3/2017 |
| CN | 208210033 | 12/2018 |
| CN | 109188824 | 1/2019 |
| JP | 2010-156899 | 7/2010 |

* cited by examiner

DISPLAY DEVICE HAVING A BUILT-IN LENS MODULE

RELATED APPLICATIONS

This application is a National Phase of PCT Patent Application No. PCT/CN2019/085489 having International filing date of May 5, 2019, which claims the benefit of priority of Chinese Patent Application No. 201910189866.4 filed on Mar. 13, 2019. The contents of the above applications are all incorporated by reference as if fully set forth herein in their entirety.

FIELD AND BACKGROUND OF THE INVENTION

The present disclosure relates to the field of display technology, and more particularly, to a display device having a built-in lens module.

Currently, front cameras have become a kind of necessary assembly in many display devices. In addition, the front cameras are generally disposed in the front of the display devices in order to satisfy spending habits of consumers.

In recent years, there has been an increasing interest in full screen display devices. However, to conventional display devices, the front cameras need to be arranged in specific areas, so the effect of full screen is not easy to be realized.

Therefore, it is necessary to provide a display device to solve the above problems.

SUMMARY OF THE INVENTION

A technical problem is that, to conventional display devices, front cameras need to be arranged in specific areas, so the effect of full screen is not easy to be realized.

The object of the present disclosure is to provide a display device having a built-in lens module to improve a screen-to-body ratio.

In order to realize the above object, the present disclosure provides a display device, including: a first substrate; a light-emitting device layer formed on the first substrate, wherein the light-emitting device layer includes a plurality of first electrodes; at least one main lens module, disposed above the light-emitting device layer, including: a second substrate; a plurality of second electrodes formed on a surface of the second substrate; and a first liquid crystal layer disposed above the second substrate; and a control module electrically connected to the plurality of first electrodes and the plurality of second electrodes and configured to control voltages of the plurality of first electrodes and the plurality of second electrodes; wherein electric fields generated between the plurality of first electrodes and electric fields generated between the plurality of second electrodes drive liquid crystal molecules in the first liquid crystal layer to be deflected and arranged as a first lens structure; and wherein the control module controls the voltages of the plurality of first electrodes and the plurality of second electrodes to vary a focus of the first lens structure.

In some embodiments, the plurality of second electrodes are formed on a top surface of the second substrate.

In some embodiments, the plurality of second electrodes are formed on a bottom surface of the second substrate.

In some embodiments, the display device further includes: an encapsulation layer formed on the light-emitting device layer; an optical adhesive layer formed between the encapsulation layer and the second substrate; a pressure sensitive adhesive layer formed on the second substrate; and a circular polarizer disposed between the pressure sensitive adhesive layer and the first liquid crystal layer.

In some embodiments, the display device further includes: a protective substrate disposed above the first liquid crystal layer; and a plurality of third electrodes formed on a bottom surface of the protective substrate.

In some embodiments, the control module is electrically connected to the plurality of third electrodes and configured to control voltages of the plurality of third electrodes; electric fields generated between the plurality of second electrodes and the plurality of third electrodes drive the liquid crystal molecules in the first liquid crystal layer to be deflected and arranged as the first lens structure; and the control module controls the voltages of the plurality of third electrodes to vary the focus of the first lens structure.

In some embodiments, the display device further includes: an encapsulation layer formed on the light-emitting device layer; a circular polarizer disposed on the encapsulation layer; and an optical adhesive layer formed between the circular polarizer and the second substrate.

In some embodiments, the display device further includes a focus-adjusting lens module including: the plurality of first electrodes; a plurality of fourth electrodes formed on the opposite surface of the second substrate; and a second liquid crystal layer disposed between the plurality of first electrodes and the plurality of fourth electrodes.

In some embodiments, the control module is electrically connected to the plurality of fourth electrodes and configured to control voltages of the plurality of fourth electrodes; electric fields generated between the plurality of first electrodes and the plurality of fourth electrodes drive liquid crystal molecules in the second liquid crystal layer to be deflected and arranged as a second lens structure; and the control module controls the voltages of the plurality of fourth electrodes to vary a focus of the second lens structure.

In some embodiments, the display device further includes: an encapsulation layer formed on the light-emitting device layer; and a circular polarizer disposed between the encapsulation layer and the second liquid crystal layer.

In some embodiments, the display device further includes: an encapsulation layer formed on the light-emitting device layer; and a circular polarizer disposed between the second liquid crystal layer and the second substrate.

In some embodiments, the first substrate is a thin-film transistor substrate, and the plurality of first electrodes are cathodes.

In some embodiments, the second substrate is a touch substrate, and the plurality of second electrodes are touch electrodes.

In order to realize the above object, the present disclosure provides a display device, including: a thin-film transistor substrate; a light-emitting device layer formed on the thin-film transistor substrate, wherein the light-emitting device layer includes a plurality of cathodes; at least one main lens module, disposed above the light-emitting device layer, including: a touch substrate; a plurality of touch electrodes formed on a surface of the touch substrate; and a first liquid crystal layer disposed above the touch substrate; a focus-adjusting lens module, including: the plurality of cathodes; a plurality of fourth electrodes formed on the opposite surface of the touch substrate; and a second liquid crystal layer disposed between the plurality of cathodes and the plurality of fourth electrodes; and a control module electrically connected to the plurality of cathodes and the plurality of touch electrodes and configured to control voltages of the plurality of cathodes and the plurality of touch electrodes;

wherein electric fields generated between the plurality of cathodes and electric fields generated between the plurality of touch electrodes drive liquid crystal molecules in the first liquid crystal layer to be deflected and arranged as a first lens structure; and wherein the control module controls the voltages of the plurality of cathodes and the plurality of touch electrodes to vary a focus of the first lens structure.

In some embodiments, the control module is electrically connected to the plurality of fourth electrodes and configured to control voltages of the plurality of fourth electrodes; electric fields generated between the plurality of cathodes and the plurality of fourth electrodes drive liquid crystal molecules in the second liquid crystal layer to be deflected and arranged as a second lens structure; and the control module controls the voltages of the plurality of fourth electrodes to vary a focus of the second lens structure.

In some embodiments, the display device further includes: an encapsulation layer formed on the light-emitting device layer; and a circular polarizer disposed between the encapsulation layer and the second liquid crystal layer.

In some embodiments, the display device further includes: an encapsulation layer formed on the light-emitting device layer; and a circular polarizer disposed between the second liquid crystal layer and the touch substrate.

The beneficial effect of the present disclosure is that, a display device having a built-in lens module is provided to improve a screen-to-body ratio.

BRIEF DESCRIPTION OF THE SEVERAL VIEWS OF THE DRAWINGS

To ensure the features and the technical content of the disclosure are more apparent and easier to understand, please refer to the explanation and the accompanying drawings of the disclosure as follows. However, the accompanying drawings are merely for reference without limiting the disclosure.

DETAILED DESCRIPTION OF SPECIFIC EMBODIMENTS OF THE INVENTION

To ensure the objects, the technical solutions, and the effects of the disclosure are clearer and more specific, the disclosure will be explained in conjunction with the accompanying drawings in detail further below. It should be understood that the embodiments described herein are merely a part of the embodiments of the present disclosure instead of all of the embodiments and not used to limit the disclosure.

Figure 1:
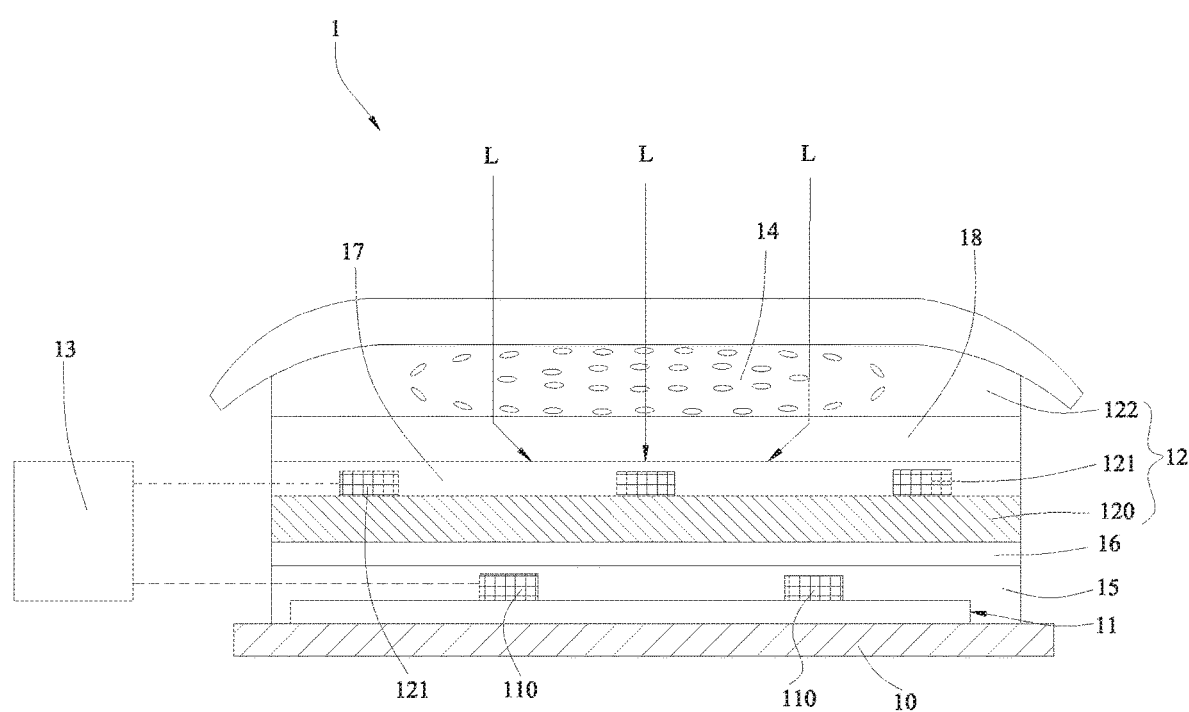
FIG. 1 is a cross-sectional view of a display device according to a first embodiment of the present disclosure.

Please refer to FIG. 1, which is a cross-sectional view of a display device according to a first embodiment of the present disclosure. In the present disclosure, a display device 1 includes a first substrate 10, a light-emitting device layer 11, at least one main lens module 12, and a control module 13. The light-emitting device layer 11 is formed on the first substrate 10 and includes a plurality of first electrodes 110. The main lens module 12 is disposed above the light-emitting device layer 11. The main lens module 12 includes a second substrate 120, a plurality of second electrodes 121 formed on a surface of the second substrate 120, and a first liquid crystal layer 122 disposed above the second substrate 120. In the present embodiment, the plurality of second electrodes 121 are formed on a top surface of the second substrate 120. The control module 13 is electrically connected to the plurality of first electrodes 110 and the plurality of second electrodes 121 and configured to control voltages of the plurality of first electrodes 110 and the plurality of second electrodes 121. For the convenience of explanation, in FIG. 1, connecting lines which connect parts of the first electrodes 110 and the control module 13 and connecting lines which connect parts of the second electrodes 121 and the control module 13 are omitted.

In the present embodiment, parallel electric fields generated between the plurality of first electrodes 110 and parallel electric fields generated between the plurality of second electrodes 121 drive liquid crystal molecules in the first liquid crystal layer 122 to be deflected and arranged as a first lens structure 14. As shown in FIG. 1, the first lens structure 14 can effectively gather incident light L and transmit the gathered light to an image capturing module (not shown). Furthermore, the control module 13 can control the voltages of the plurality of first electrodes 110 and the plurality of second electrodes 121 to vary a focus of the first lens structure 14.

In the present embodiment, the display device 1 further includes an encapsulation layer 15, an optical adhesive layer 16, a pressure sensitive adhesive layer 17, and a circular polarizer 18. The encapsulation layer 15 is formed on the light-emitting device layer 11. The optical adhesive layer 16 is formed between the encapsulation layer 15 and the second substrate 120. The pressure sensitive adhesive layer 17 is formed on the second substrate 120. The circular polarizer 18 is disposed between the pressure sensitive adhesive layer 17 and the first liquid crystal layer 122.

Specifically, the first substrate 10 is a thin-film transistor substrate, and the first electrodes 110 are cathodes. In addition, the second substrate 120 is a touch substrate, and the second electrodes 121 are touch electrodes.

Figure 2:
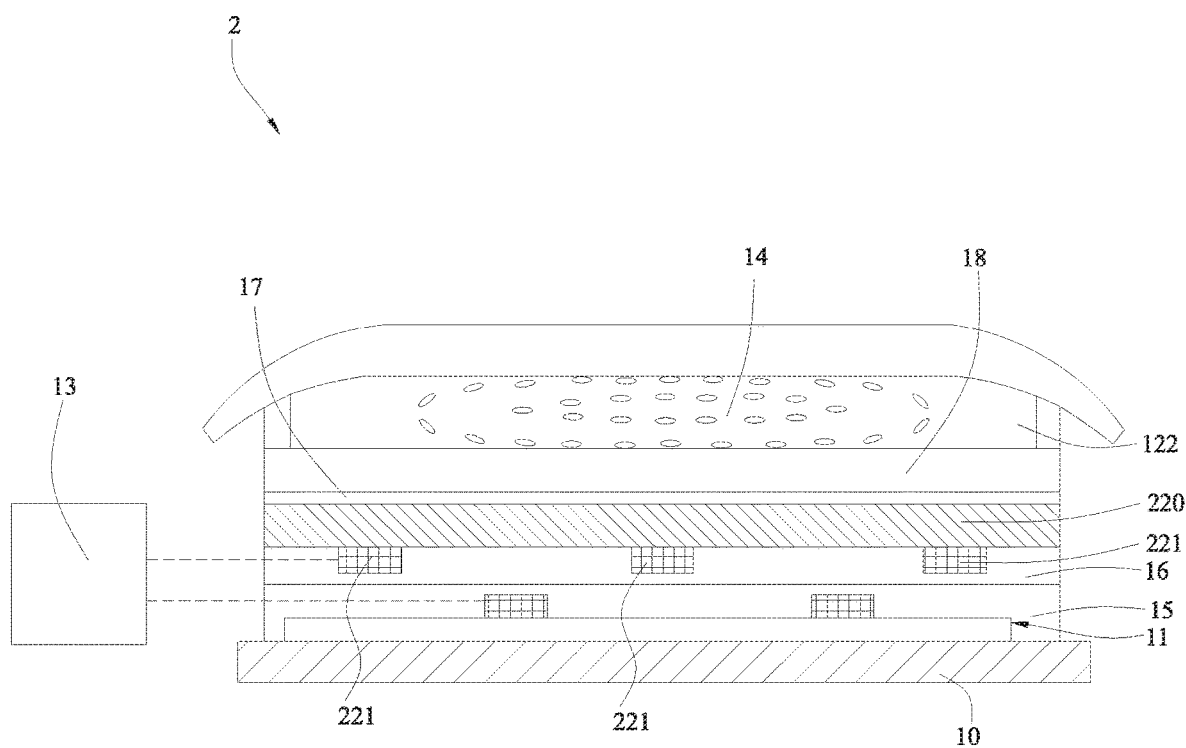
FIG. 2 is a cross-sectional view of a display device according to a second embodiment of the present disclosure.

Please refer to FIG. 2, which is a cross-sectional view of a display device according to a second embodiment of the present disclosure. The difference between FIG. 2 and FIG. 1 is merely that a plurality of second electrodes 221 of a display device 2 are formed on a bottom surface of a second substrate 220. The other components of the display device 2 are the same as those of FIG. 1 and are not repeated here.

Figure 3:
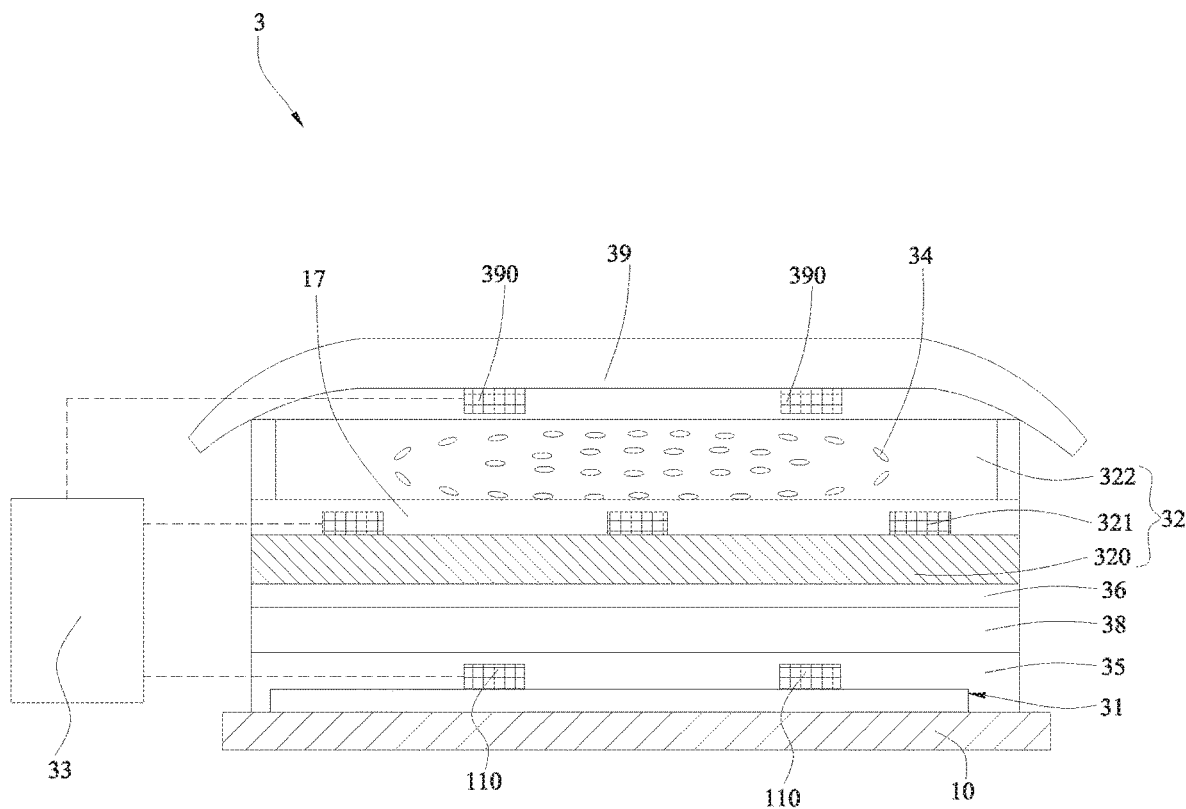
FIG. 3 is a cross-sectional view of a display device according to a third embodiment of the present disclosure.

Please refer to FIG. 3, which is a cross-sectional view of a display device according to a third embodiment of the present disclosure. In addition to the components shown in FIG. 1 and FIG. 2, a display device 3 further includes a protective substrate 39 and a plurality of third electrodes 390 formed on a bottom surface of the protective substrate 39. In the present embodiment, the protective substrate 39 is disposed above a first liquid crystal layer 322. An encapsulation layer 35 is formed on a light-emitting device layer 31. A circular polarizer 38 is disposed on the encapsulation layer 35. An optical adhesive layer 36 is formed between the circular polarizer 38 and a second substrate 320. Furthermore, a control module 33 is electrically connected to a plurality of second electrodes 321 and the plurality of third electrodes 390 and configured to control voltages of the plurality of second electrodes 321 and the plurality of third electrodes 390. For the convenience of explanation, in FIG. 3, connecting lines which connect parts of the second electrodes 321 and the control module 33 and connecting lines which connect parts of the third electrodes 390 and the control module 33 are omitted. In the present embodiment, vertical electric fields generated between the plurality of second electrodes 321 and the plurality of third electrodes 390 drive liquid crystal molecules in the first liquid crystal layer 322 to be deflected and arranged as a first lens structure 34. Furthermore, the control module 33 can control the voltages of the plurality of second electrodes 321 and the plurality of third electrodes 390 to vary a focus of the first lens structure 34. In FIG. 3, in addition to the above components, the other components of the display device 3 are the same as those of FIG. 1 and are not repeated here.

Figure 4:
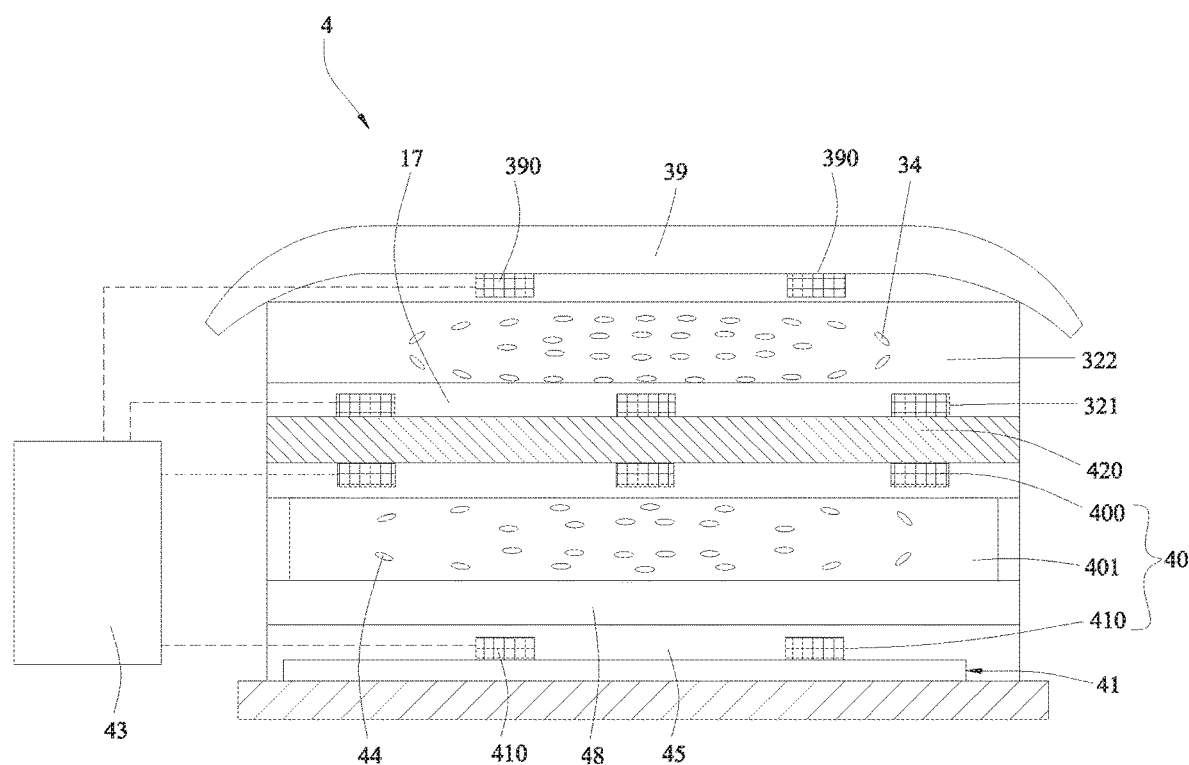
FIG. 4 is a cross-sectional view of a display device according to a fourth embodiment of the present disclosure.

Please refer to FIG. 4, which is a cross-sectional view of a display device according to a fourth embodiment of the present disclosure. In addition to the components shown in FIG. 3, a display device 4 further includes a focus-adjusting lens module 40. The focus-adjusting lens module 40 includes a plurality of first electrodes 410, a plurality of fourth electrodes 400 formed on the opposite surface of the second substrate 420, and a second liquid crystal layer 401 disposed between the plurality of first electrodes 410 and the plurality of fourth electrodes 400. In the present embodiment, an encapsulation layer 45 is formed on a light-emitting device layer 41. A circular polarizer 48 is disposed between the encapsulation layer 45 and the second liquid crystal layer 401. Furthermore, a control module 43 is electrically connected to the plurality of first electrodes 410 and the plurality of fourth electrodes 400 and configured to control voltages of the plurality of first electrodes 410 and the plurality of fourth electrodes 400. For the convenience of explanation, in FIG. 4, connecting lines which connect parts of the first electrodes 410 and the control module 43 and connecting lines which connect parts of the fourth electrodes 400 and the control module 43 are omitted. In the present embodiment, vertical electric fields generated between the plurality of first electrodes 410 and the plurality of fourth electrodes 400 drive liquid crystal molecules in the second liquid crystal layer 401 to be deflected and arranged as a second lens structure 44. Furthermore, the control module 43 can control the voltages of the plurality of first electrodes 410 and the plurality of fourth electrodes 400 to vary a focus of the second lens structure 44. In the present embodiment, the focus-adjusting lens module 40 can replace an ordinary zoom lens to better control the incident light L. In FIG. 4, in addition to the above components, the other components of the display device 4 are the same as those of FIG. 3 and are not repeated here.

Figure 5:
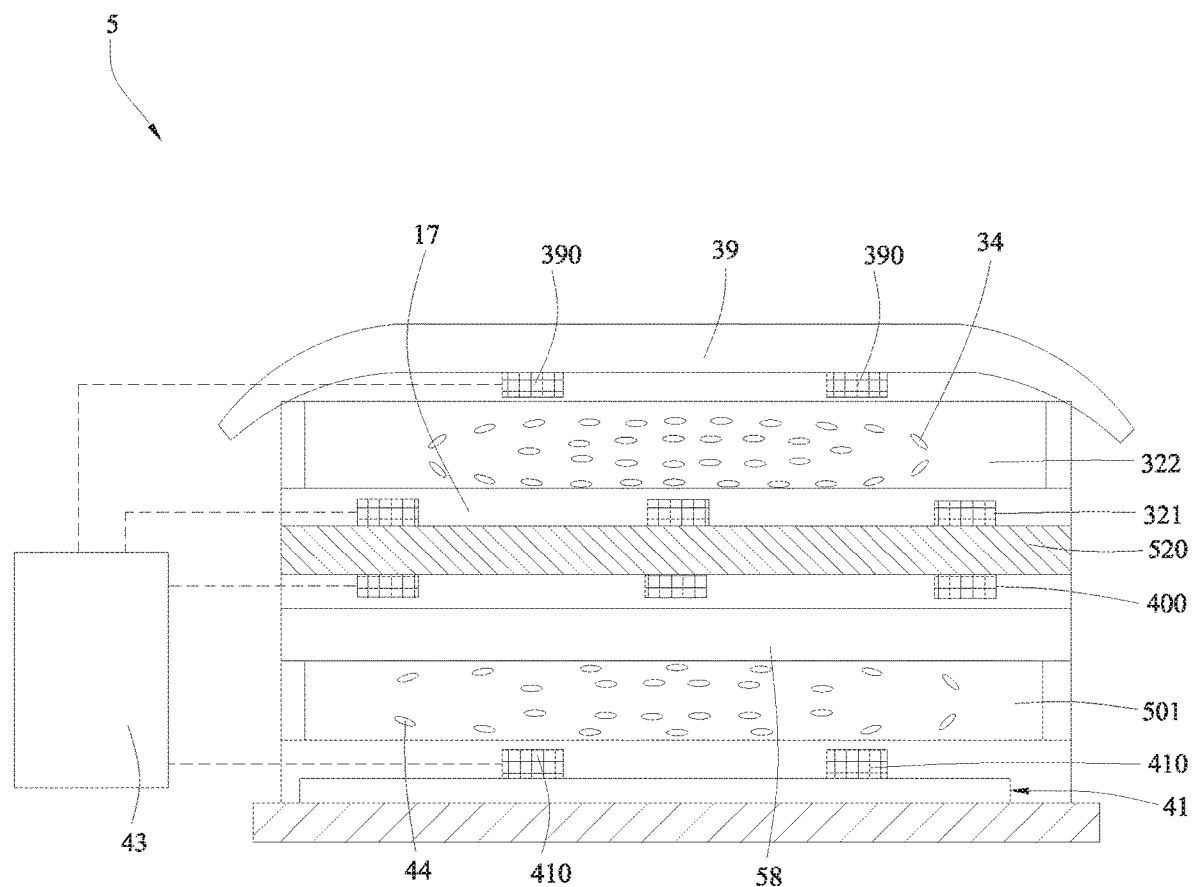
FIG. 5 is a cross-sectional view of a display device according to a fifth embodiment of the present disclosure.

Please refer to FIG. 5, which is a cross-sectional view of a display device according to a fifth embodiment of the present disclosure. The difference between FIG. 5 and FIG. 4 is merely that a circular polarizer 58 of a display device 5 is disposed between a second liquid crystal layer 501 and a second substrate 520. The other components of the display device 5 are the same as those of FIG. 4 and are not repeated here.

Figure 6A:
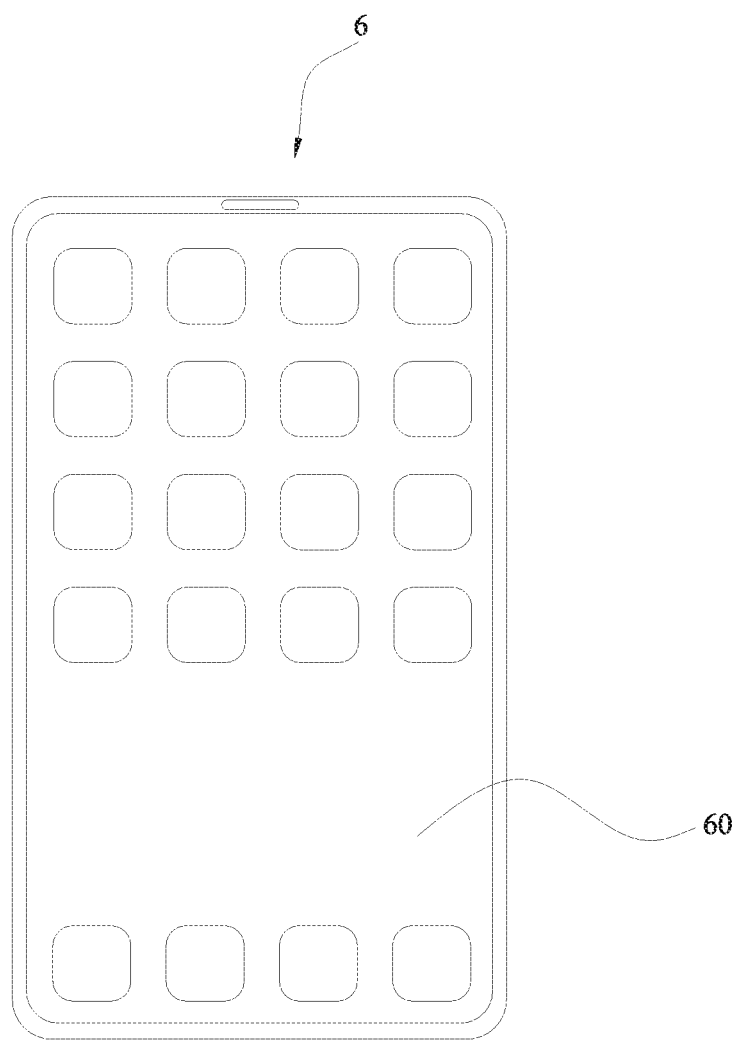
FIG. 6A is a schematic diagram of a display device in a normal display mode according to an embodiment of the present disclosure.
Figure 6B:
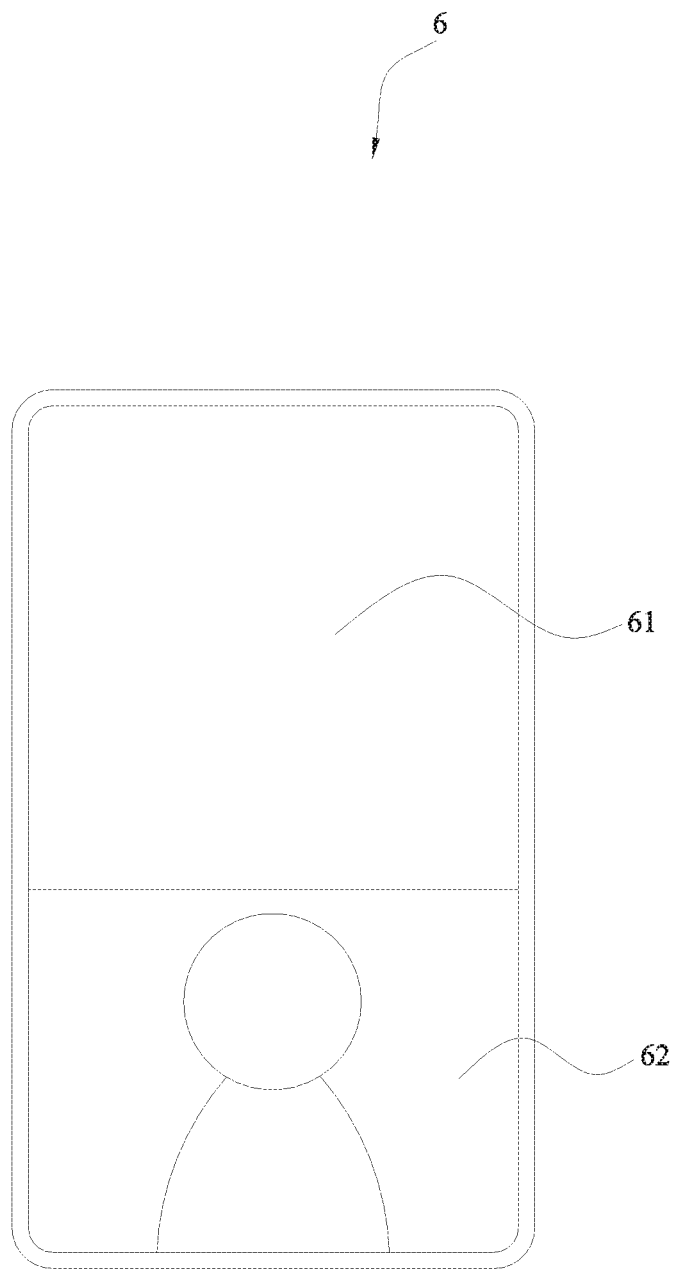
FIG. 6B is a schematic diagram of a display device in a selfie mode according to an embodiment of the present disclosure.

Please refer to FIG. 6A, which is a schematic diagram of a display device in a normal display mode according to an embodiment of the present disclosure. Also referring to FIG. 6B, which is a schematic diagram of a display device in a selfie mode according to an embodiment of the present disclosure. When a display device 6 of the present disclosure is in a normal display mode, the main lens module and the focus-adjusting lens module are not driven, and thus a total display area 60 of the display device 6 is used to output images. When the display device 6 of the present disclosure is in a selfie mode, the main lens module and the focus-adjusting lens module are driven, and then a display area 61 where the main lens module and the focus-adjusting lens module are located is used to receive images. Meanwhile, another display area 62 is used to display the images for reference.

In conclusion, the present disclosure provides a display device mainly through arranging a main lens module and a focus-adjusting lens module in a display area. Thus, front cameras do not need to be arranged in specific areas so that a screen-to-body ratio is improved.

It should be understood that the application of the present disclosure is not limited by the foregoing examples. A person of ordinary skill in the art is able to make modifications or changes based on the foregoing description, and all of these modifications and changes are within the scope of the appended claims of the present disclosure.

The industrial applicability of the present disclosure is that, for the display device provided in the present disclosure, front cameras do not need to be arranged in specific areas so that a screen-to-body ratio is improved.

What is claimed is:

1. A display device, comprising:
   a first substrate;
   a light-emitting device layer formed on the first substrate, wherein the light-emitting device layer comprises a plurality of first electrodes;
   at least one main lens module, disposed above the light-emitting device layer, comprising:
      a second substrate;
      a plurality of second electrodes formed on a surface of the second substrate; and
      a first liquid crystal layer disposed above the second substrate; and
   a control module electrically connected to the plurality of first electrodes and the plurality of second electrodes and configured to control voltages of the plurality of first electrodes and the plurality of second electrodes; and
   a focus-adjusting lens module, comprising:
      the plurality of first electrodes;
      a plurality of third electrodes formed on an opposite surface of the second substrate; and
      a second liquid crystal layer disposed between the plurality of first electrodes and the plurality of third electrodes;
   wherein an encapsulation layer is formed on the light-emitting device layer, and a circular polarizer is disposed between the encapsulation layer and the second liquid crystal layer;
   wherein electric fields generated between the plurality of first electrodes and electric fields generated between the plurality of second electrodes drive liquid crystal molecules in the first liquid crystal layer to be deflected and arranged as a first lens structure; and
   wherein the control module controls the voltages of the plurality of first electrodes and the plurality of second electrodes to vary a focus of the first lens structure.

2. The display device of claim 1, wherein the plurality of second electrodes are formed on a top surface of the second substrate.

3. The display device of claim 1, wherein the plurality of second electrodes are formed on a bottom surface of the second substrate.

4. The display device of claim 1, further comprising:
a protective substrate disposed above the first liquid crystal layer; and
a plurality of fourth electrodes formed on a bottom surface of the protective substrate.

5. The display device of claim 4, wherein the control module is electrically connected to the plurality of fourth electrodes and configured to control voltages of the plurality of fourth electrodes;
wherein electric fields generated between the plurality of second electrodes and the plurality of fourth electrodes drive the liquid crystal molecules in the first liquid crystal layer to be deflected and arranged as the first lens structure; and
wherein the control module controls the voltages of the plurality of fourth electrodes to vary the focus of the first lens structure.

6. The display device of claim 4, further comprising:
an encapsulation layer formed on the light-emitting device layer;
a circular polarizer disposed on the encapsulation layer; and
an optical adhesive layer formed between the circular polarizer and the second substrate.

7. The display device of claim 1, wherein the control module is electrically connected to the plurality of third electrodes and configured to control voltages of the plurality of third electrodes;
wherein electric fields generated between the plurality of first electrodes and the plurality of third electrodes drive liquid crystal molecules in the second liquid crystal layer to be deflected and arranged as a second lens structure; and
wherein the control module controls the voltages of the plurality of third electrodes to vary a focus of the second lens structure.

8. The display device of claim 1, further comprising:
an encapsulation layer formed on the light-emitting device layer; and
a circular polarizer disposed between the second liquid crystal layer and the second substrate.

9. The display device of claim 1, wherein the first substrate is a thin-film transistor substrate, and the plurality of first electrodes are cathodes.

10. The display device of claim 1, wherein the second substrate is a touch substrate, and the plurality of second electrodes are touch electrodes.

11. A display device, comprising:
a thin-film transistor substrate;
a light-emitting device layer formed on the thin-film transistor substrate, wherein the light-emitting device layer comprises a plurality of cathodes;
at least one main lens module, disposed above the light-emitting device layer, comprising:
a touch substrate;
a plurality of touch electrodes formed on a surface of the touch substrate; and
a first liquid crystal layer disposed above the touch substrate; and
a focus-adjusting lens module, comprising:
the plurality of cathodes;
a plurality of electrodes formed on an opposite surface of the touch substrate; and
a second liquid crystal layer disposed between the plurality of cathodes and the plurality of electrodes; and
a control module electrically connected to the plurality of cathodes and the plurality of touch electrodes and configured to control voltages of the plurality of cathodes and the plurality of touch electrodes;
wherein an encapsulation layer is formed on the light-emitting device layer, and a circular polarizer is disposed between the encapsulation layer and the second liquid crystal layer;
wherein electric fields generated between the plurality of cathodes and electric fields generated between the plurality of touch electrodes drive liquid crystal molecules in the first liquid crystal layer to be deflected and arranged as a first lens structure; and
wherein the control module controls the voltages of the plurality of cathodes and the plurality of touch electrodes to vary a focus of the first lens structure.

12. The display device of claim 11, wherein the control module is electrically connected to the plurality of electrodes and configured to control voltages of the plurality of electrodes;
wherein electric fields generated between the plurality of cathodes and the plurality of electrodes drive liquid crystal molecules in the second liquid crystal layer to be deflected and arranged as a second lens structure; and
wherein the control module controls the voltages of the plurality of electrodes to vary a focus of the second lens structure.

13. The display device of claim 11, further comprising:
an encapsulation layer formed on the light-emitting device layer; and
a circular polarizer disposed between the second liquid crystal layer and the touch substrate.

* * * * *